(12) United States Patent
Watanabe (10) Patent No.: US 8,360,583 B2
(45) Date of Patent: Jan. 29, 2013

(54) IMAGE DISPLAY DEVICE WITH EXIT PUPIL MOVING FOR TRACKING VIEWER'S PUPIL

(75) Inventor: Mitsuyoshi Watanabe, Hashima (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 227 days.

(21) Appl. No.: 12/852,962

(22) Filed: Aug. 9, 2010

(65) Prior Publication Data

US 2010/0302499 A1 Dec. 2, 2010

Related U.S. Application Data

(63) Continuation-in-part of application No. PCT/JP2009/052267, filed on Feb. 12, 2009.

(30) Foreign Application Priority Data

Feb. 12, 2008 (JP) .................. 2008-029938

(51) Int. Cl.
*G03B 21/26* (2006.01)
*G02F 1/03* (2006.01)
*G02F 1/07* (2006.01)
*G09G 3/04* (2006.01)

(52) U.S. Cl. ............... 353/28; 359/254; 345/32; 345/43

(58) Field of Classification Search .............. 353/28; 359/266, 254; 345/32, 43
See application file for complete search history.

(56) References Cited

U.S. PATENT DOCUMENTS

| 6,215,579 B1 * | 4/2001 | Bloom et al. ............... 359/298 |
| 6,639,570 B2 * | 10/2003 | Furness et al. .................. 345/8 |
| 6,768,588 B2 | 7/2004 | Urey |
| 6,954,308 B2 | 10/2005 | Urey |
| 7,133,204 B2 | 11/2006 | Urey |
| 2003/0086172 A1 | 5/2003 | Urey |

FOREIGN PATENT DOCUMENTS

| JP | A-06-235943 | 8/1994 |
| JP | A-08-502372 | 3/1996 |
| JP | A-2005-509189 | 4/2005 |
| JP | A-2007-298278 | 11/2007 |
| JP | A-2008-083248 | 4/2008 |
| WO | WO 94/09472 A1 | 4/1994 |

OTHER PUBLICATIONS

International Search Report issued in Application No. PCT/JP2009/052267; Dated May 26, 2009 (With Translation).
Written Opinion of the International Searching Authority issued in Application No. PCT/JP2009/052267; Dated May 26, 2009 (With Translation).
Sep. 11, 2012 Office Action issued in Japanese Patent Application No. 2008-029938 (with English Translation).

* cited by examiner

*Primary Examiner* — Georgia Y Epps
*Assistant Examiner* — Magda Cruz
(74) *Attorney, Agent, or Firm* — Oliff & Berridge, PLC (57) ABSTRACT

An image display device for optically displaying an image is disclosed. This device includes: a light source; an imaging-light generator converting light emitted from the light source, into imaging light representative of the image to be displayed to a viewer, to thereby generate the imaging light; and an exit-pupil controlling unit configured to control a position of an exit pupil of the image display device. The exit-pupil controlling unit includes: an electrically controllable element configured to diffract the imaging light incoming from the imaging-light generator, at an electrically-variable diffraction angle; and a controller configured to electrically control the diffraction angle of diffracted light emitted from the electrically controllable element, to thereby control the position of the exit pupil.

13 Claims, 11 Drawing Sheets

FIG.3A  MODE 1: ELECTRODE OFF

0-TH ORDER LIGHT

FIG.3B  MODE 2: ELECTRODE 2LINE2SPACE ON

±FIRST ORDER LIGHT
SMALL DEFLECTION ANGLE

FIG.3C  MODE 3: ELECTRODE 1LINE1SPACE ON

±FIRST ORDER LIGHT
LARGE DEFLECTION ANGLE

FIG.4A  MODE 1

FIG.4B  MODE 2

FIG.4C  MODE 3

FIG.10A  MODE 4

IMAGE DISPLAY DEVICE WITH EXIT PUPIL MOVING FOR TRACKING VIEWER'S PUPIL

CROSS-REFERENCE TO RELATED APPLICATIONS

The present application is based on and claims the benefit of priority from Japanese Patent Application No. 2008-029938 filed Feb. 12, 2008, and International Application No. PCT/JP2009/052267 filed Feb. 12, 2009, the contents of which are incorporated herein by reference in their entirety.

This application is a continuation-in-part application of International Application No. PCT/JP2009/052267 filed Feb. 12, 2009, now pending, which was published in Japanese under PCT Article 21(2).

BACKGROUND OF THE INVENTION

1. Field of the Invention

The invention relates generally to techniques of optically displaying an image, and more particularly to improvements in techniques of moving an exit pupil of an image display device.

2. Description of the Related Art

As techniques of optically displaying an image, there are known, for example, a technique of projecting imaging light representing an image to be displayed, directly onto a viewer's retina, to thereby allow the viewer to perceive the image as a virtual image, and a technique of projecting such imaging light onto a physical display screen, to thereby allow the viewer to perceive the image as a real image.

Further, as techniques of converting light emitted from a light source into imaging light representing an image to be displayed, there are known, for example, a technique of spatially modulating surface light emitted from a light source at a time, using a spatial light modulator such as an LCD (Liquid-Crystal Display), on a per-pixel basis, to thereby generate the imaging light in the form of surface light, and a technique of converting a light beam emitted from a light source into imaging light in the form of surface light, using a scanner, wherein the light beam has been intensity-modulated on a per-pixel basis.

Japan Patent Application Publication No. hei 8-502372 discloses a head-mounted display device acting as an exemplary device for optically displaying an image. This head-mounted display device employs a technique of projecting imaging light representing an image to be displayed, directly onto a viewer's retina, to thereby allow the viewer to perceive the image as a virtual image, and a technique of converting a light beam emitted from a light source into imaging light in the form of surface light, using a scanner, wherein the light beam has been intensity-modulated on a per-pixel basis.

The disclosed head-mounted display device further employs an additional technique of detecting the position of a pupil of a viewer who attempts to view a display image, and of moving an exit pupil of the head-mounted display device to track movement of the viewer's pupil.

BRIEF SUMMARY OF THE INVENTION

However, any techniques having been proposed so far for moving the exit pupil are not adequately practical, and such traditional techniques are difficult to achieve fast high-speed movement of the exit pupil.

In view of the foregoing, it would be desirable to move the exit pupil at an increased speed.

According to some aspects of the invention, an image display device for optically displaying an image is provided.

This image display device comprises:

a light source;

an imaging-light generator converting light emitted from the light source, into imaging light representative of the image to be displayed to a viewer, to thereby generate the imaging light; and an exit-pupil controlling unit configured to control a position of an exit pupil of the image display device, wherein the exit-pupil controlling unit comprises:

an electrically controllable element configured to diffract the imaging light incoming from the imaging-light generator, at an electrically-variable diffraction angle; and a controller configured to electrically control the diffraction angle of diffracted light emitted from the electrically controllable element, to thereby control the position of the exit pupil.

It is noted here that, as used in this specification, the singular form "a," "an," and "the" include plural reference unless the context clearly dictates otherwise. It is also noted that the terms "comprising," "including," and "having" can be used interchangeably.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

According to the invention, the following modes are provided as illustrative embodiments of the invention:

(1) An image display device for optically displaying an image, comprising:
a light source;
an imaging-light generator converting light emitted from the light source, into imaging light representative of the image to be displayed to a viewer, to thereby generate the imaging light; and
an exit-pupil controlling unit configured to control a position of an exit pupil of the image display device,
wherein the exit-pupil controlling unit comprises:
an electrically controllable element configured to diffract the imaging light incoming from the imaging-light generator, at an electrically-variable diffraction angle; and
a controller configured to electrically control the diffraction angle of diffracted light emitted from the electrically controllable element, to thereby control the position of the exit pupil.

(2) The image display device according to mode (1), wherein the electrically controllable element includes a liquid-crystal optical device,
the liquid-crystal optical device is configured to include a plurality of stripe electrodes to which a plurality of respective voltages are applied at a time, and a liquid-crystal layer having a surface on which the electrodes are formed, the liquid-crystal optical device emitting the diffracted light at the diffraction angle which varies depending on a voltage distribution pattern of the voltages applied to the electrodes, and
the controller includes a distribution pattern changer configured to change the voltage distribution pattern, to thereby control the position of the exit pupil.

(3) The image display device according to mode (1), wherein the electrically controllable element includes a grating light valve (GLV), and
the grating light valve is configured to include:
reflective and fixed ribbons; and
reflective and movable ribbons which are moved relative to the fixed ribbons, depending on an electric signal.

(4) The image display device according to mode (1), wherein the electrically controllable element includes a diffraction grating which is made of an electrically expandable material in a direction in which a diffraction pitch is measured, to thereby allow the diffraction pitch to be electrically variable.

(5) The image display device according to mode (1), wherein the electrically controllable element can emit a plurality of diffracted light beams wholly or partly,
the diffracted light beams form a plurality of possible positions of the exit pupil, respectively, and
the controller is configured to electrically control the electrically controllable element such that at least part of only one of the diffracted light beams enters the viewer's pupil, based on relative position information between an actual position of the viewer's pupil and the possible positions of the exit pupil, to thereby move the exit pupil to track movement of the viewer's pupil.

(6) The image display device according to mode (1), wherein the electrically controllable element can emit a plurality of diffracted light beams wholly or partly,
the diffracted light beams form a plurality of possible positions of the exit pupil, respectively, and
the controller is configured to electrically control the electrically controllable element such that an entirety of only one of the diffracted light beams enters the viewer's pupil, based on relative position information between an actual position of the viewer's pupil and the possible positions of the exit pupil, to thereby move the exit pupil to track movement of the viewer's pupil.

(7) The image display device according to mode (1), wherein the electrically controllable element has an optical axis and emits diffracted light beams to positive and negative sides of the optical axis, and
the controller is configured to electrically control the electrically controllable element, such that intensities of the diffracted light beams are higher on a selected one of the positive and negative sides, than on an unselected side.

(8) The image display device according to mode (1), wherein the controller is configured to electrically control the electrically controllable element, such that the exit pupil moves discretely as the viewer's pupil moves.

(9) The image display device according to mode (1), further comprising a pupil-position sensor detecting the position of the viewer's pupil, wherein the controller is configured to electrically control the electrically controllable element such that the exit pupil moves to track movement of the viewer's pupil, based on an output signal of the pupil-position sensor.

(10) The image display device according to mode (1), which is configured to have an intermediate image plane at a position on a pathway of the imaging light, wherein the electrically controllable element is disposed at a position generally equal to the position of the intermediate image plane.

(11) The image display device according to mode (1), wherein the electrically controllable element diffracts the imaging light incoming from the imaging-light generator, two dimensionally, and the controller is configured to electrically control the electrically controllable element such that the position of the exit pupil is controlled two dimensionally so as to track movement of the viewer's pupil.

(12) The image display device according to mode (1), wherein the controller is configured to electrically control the diffraction angle of the diffracted light emitted from the electrically controllable element, based on an input signal indicative of a user's instruction, to thereby move the exit pupil toward a target position represented by the input signal.

(13) The image display device according to mode (1), further comprising an intensity compensator configured to compensate an intensity of outgoing light from the light source, depending on the position of the exit pupil.

Several presently preferred embodiments of the invention will be described in more detail by reference to the drawings in which like numerals are used to indicate like elements throughout.

Figure 1:
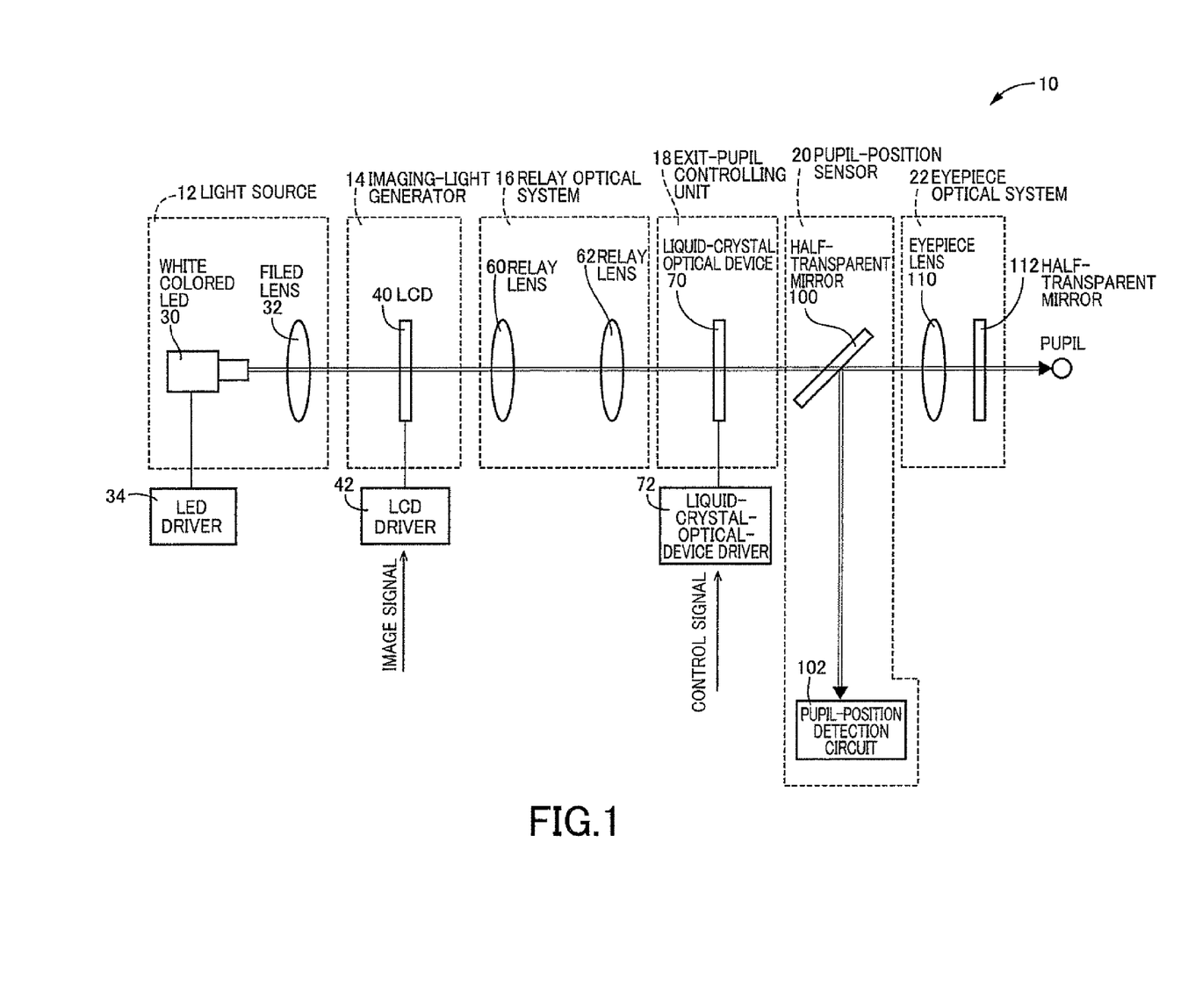
FIG. 1 is a schematic diagram conceptually illustrating a head-mounted display device 10 according to an illustrative first embodiment of the invention.

Referring now to FIG. 1, there is illustrated conceptually in an optical path diagram, a head-mounted display device 10 according to an illustrative first embodiment of the invention. This head-mounted display device 10 is an image display device which is mounted on a viewer's head (not shown) when in use.

The head-mounted display device 10 is generally configured to spatially modulate surface light emitted from a light source at a time, using a spatial light modulator, on a per-pixel basis, and project the thus-generated imaging light through the viewer's pupil, directly onto the viewer's retina, to thereby allow the viewer to view an image as a virtual image.

More specifically, the head-mounted display device 10 is configured to include a light source 12; an imaging-light generator 14; a relay optical system 16; an exit-pupil controlling unit 18; a pupil-position sensor 20; and an eyepiece optical system 22, in a linear array, in the description order. A set of these components is provided for the viewer's right eye, and another set is provided for the viewer's left eye, allowing the same imaging light to enter both eyes of the viewer.

The light source 12 is configured to include a white colored LED (Light-Emitting Diode) 30 acting as an exemplary light source, and a field lens 32 on which white light emitted from the while colored LED 30 is incident. The white colored LED 30 is driven by an LED driver 34, to thereby emit white light.

The imaging-light generator 14 is configured to include an LCD (Liquid-Crystal Display) 40 which is an example of a flat panel display (i.e., an exemplary spatial light modulator). The LCD 40 is configured to include a color filter (e.g., an RGB filter) for decomposing the white light emitted from the field lens 32 into three color light components (i.e., RGB components), on a per-pixel basis, and a liquid-crystal panel for controlling transparency or transmissivity to each light component. The liquid-crystal panel has a plurality of pixels, and controls the transmissivity to each light component, on a per-pixel basis.

Some examples of the LCD 40 are disclosed in Japanese Patent Application Publication No. hei 11-194313, the content of which is incorporated hereinto by reference in its entirety. The LCD 40 is driven by an LCD driver 42, to thereby spatially modulate the white light emitted from the white colored LED 30.

In the present embodiment, the imaging-light generator 14 is configured to use, but not limited to, a flat panel display as a principle component, and may alternatively be configured to use, for example, an optical scanner as a principle component. In this alternative, the head-mounted display device 10 is referred to also as "retinal scanning display device."

In addition, in the present embodiment, a flat panel display is exemplified as, but not limited to, the LCD 40, and may alternatively be exemplified as, for example, an organic electroluminescence display or a digital micro-mirror device.

The relay optical system 16 is configured to include a front-stage relay lens 60 and a rear-stage relay lens 62.

The exit-pupil controlling unit 18 is disposed to control the position of the exit pupil of the head-mounted display device 10, so as to track movement of the viewer's pupil. The exit-pupil controlling unit 18 is configured using a liquid-crystal optical device 70 which is an exemplary electrically-controllable-element, as a major component.

The liquid-crystal optical device 70 acts as a diffraction grating diffracting incident light at an electrically variable diffraction angle. Further, the liquid-crystal optical device 70 is configured to act as, but not limited to, a transparent diffraction grating, and may alternatively be configured to act as a reflective diffraction grating.

The liquid-crystal optical device 70 is designed, but not limited to, to diffract incident light two-dimensionally, and may alternatively be designed to diffract incident light one-dimensionally. The liquid-crystal optical device 70, as illustrated in FIG. 2 in cross section, is in the form of a monolithic laminate of a first portion 72 for diffracting incident light in an X-direction or a horizontal direction, a second portion 74 for diffracting incident light in an Y-direction or a vertical direction, and a common transparent glass substrate 76, with the first and second portions 72 and 74 interposed between the substrate 76.

One example of a conventional version of the liquid-crystal optical device 70 is disclosed in Japanese Patent Application Publication No. 2001-100026, which is incorporated hereinto by reference in its entirety.

Figure 2:
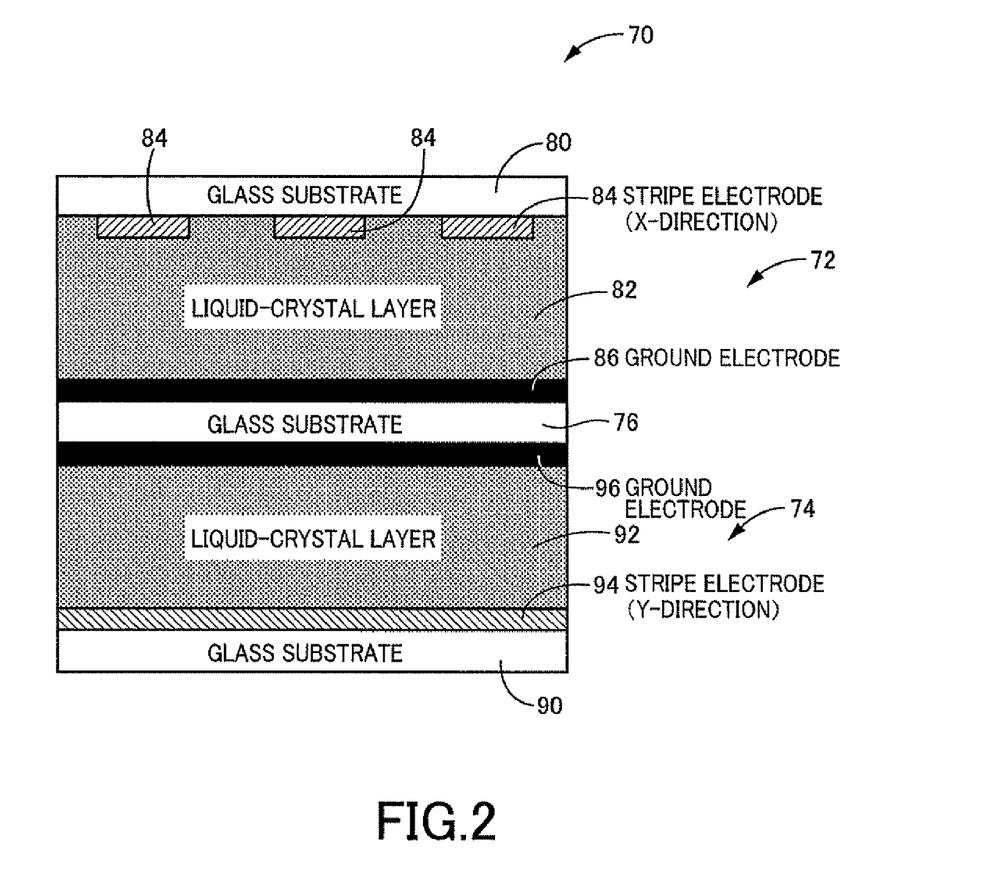
FIG. 2 is a cross section illustrating a liquid-crystal optical device 70 depicted in FIG. 1.

As illustrated in FIG. 2, the first portion 72 is in the form of a laminate of a transparent glass substrate 80 and a liquid-crystal layer 82. On a front face of the liquid-crystal layer 82, there are formed a plurality of stripe-shaped electrodes 84 in a parallel array. The electrodes 84 are in an array of transparent electrodes in the X-direction. In FIG. 3, the electrodes 84 are illustrated in a front view.

On the other hand, on a back face of the liquid-crystal layer 82, there is formed a common ground electrode 86 to the electrodes 84. The ground electrode 86 is also a transparent electrode.

For activating the first portion 72, voltages are applied across selected ones of the electrodes 84 and the ground electrode 86, to thereby apply on the liquid-crystal layer 82 an electric field having a profile responsive to the positions of the selected electrodes 84. As a result, liquid-crystal molecules in the liquid-crystal layer are tilted, to thereby vary the refractive index of the liquid-crystal layer 82.

Figure 3A:
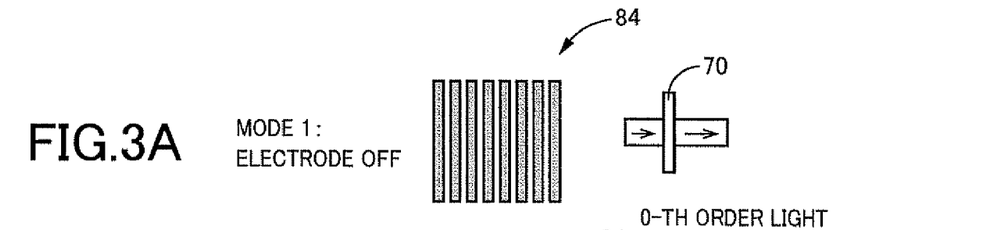
FIGS. 3A, 3B and 3C are views for explanation of a relationship between possible diffraction patterns of the liquid-crystal optical device 70 depicted in FIG. 2, and possible modes in which voltages are applied to electrodes 84 of the liquid-crystal optical device 70.

As illustrated in FIG. 3, as voltage distribution patterns in which voltages can be applied to the electrodes 84, respectively, modes 1-3 are provided. If mode 1 is selected, then, as illustrated in FIG. 3A, no voltage is applied to the electrodes 84. This is illustrated in graph in FIG. 4A. As a result, as illustrated in FIG. 3A, incoming light from the relay optical system 16 passes through the first portion 72 unimpeded, as a 0-th order diffracted light beam.

Figure 3B:
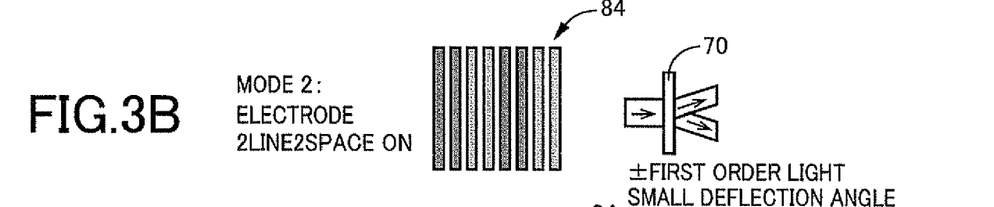
Figure 4A:
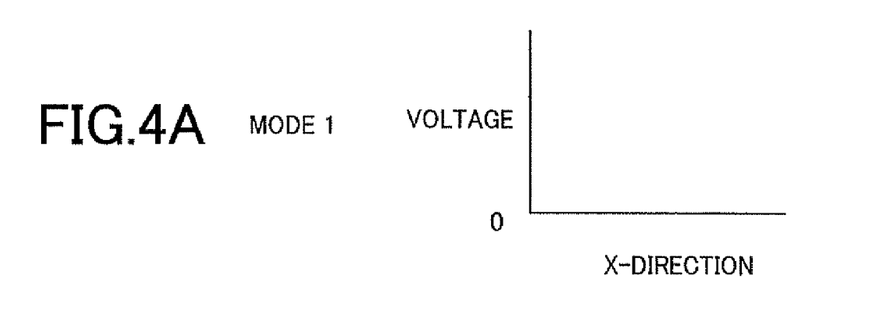
FIGS. 4A, 4B and 4C are graphs for explanation of possible modes in which voltages are applied to the electrodes 84 of the liquid-crystal optical device 70 depicted in FIG. 2.
Figure 4B:
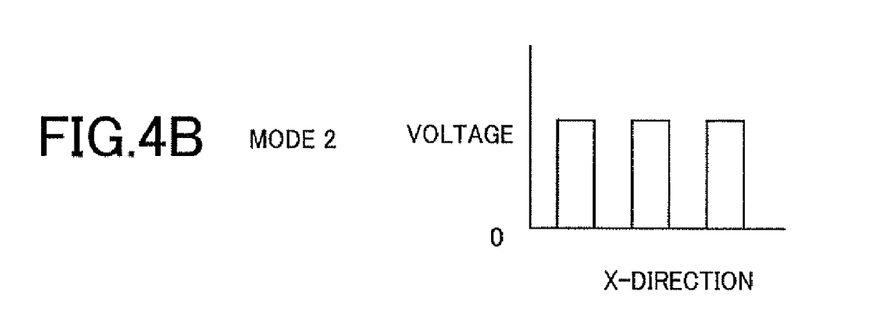

If, alternately, mode 2 is selected, then, as illustrated in FIG. 3B, voltages are applied to the electrodes 84 in twos, every other two electrodes (i.e., 2-line, 2-space), like voltages are applied to a first pair of adjacent two of the electrodes 84, while no voltage is applied to a second pair of adjacent two electrodes 84 which is next to the first pair. This is illustrated in graph in FIG. 4B. As a result, as illustrated in FIG. 3B, the first portion 72 generates from incoming light from the relay optical system 16, two diffracted light beams, that is, positive and negative first order diffracted light beams.

Figure 3C:
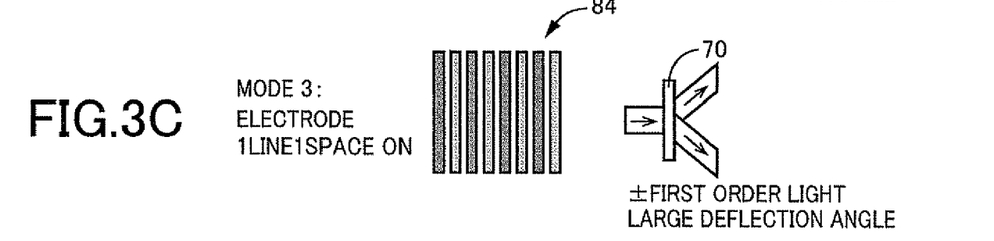
Figure 4C:
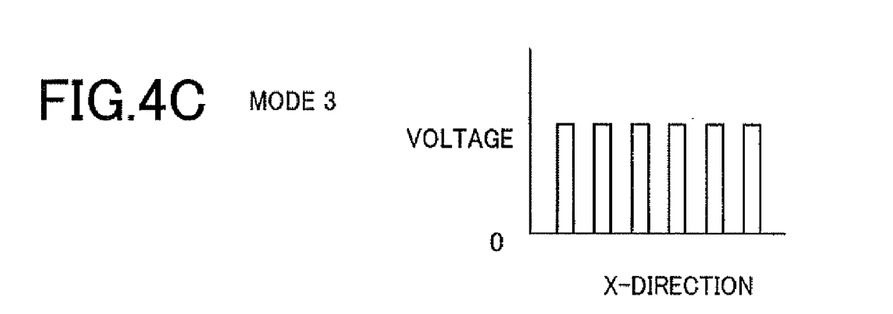

If, alternatively, mode 3 is selected, then, as illustrated in FIG. 3C, voltages are applied to the electrodes 84 in ones, every other one electrode (i.e., 1-line, 1-space). This is illustrated in graph in FIG. 4C. As a result, as illustrated in FIG. 30, the first portion 72 generates from incoming light from the relay optical system 16, two diffracted light beams, that is, positive and negative first order diffracted light beams. Each diffracted light beam is emitted from the first portion 72 at a larger angle (i.e., deflection or diffraction angle) than when mode 2 is alternatively selected.

Therefore, if the voltage distribution pattern for voltages applied to the first portion 72 changes from mode 1 to mode 3 through mode 2 sequentially, then the first portion 72 emits a diffracted light beam at a time-varying diffraction angle.

Figure 5:
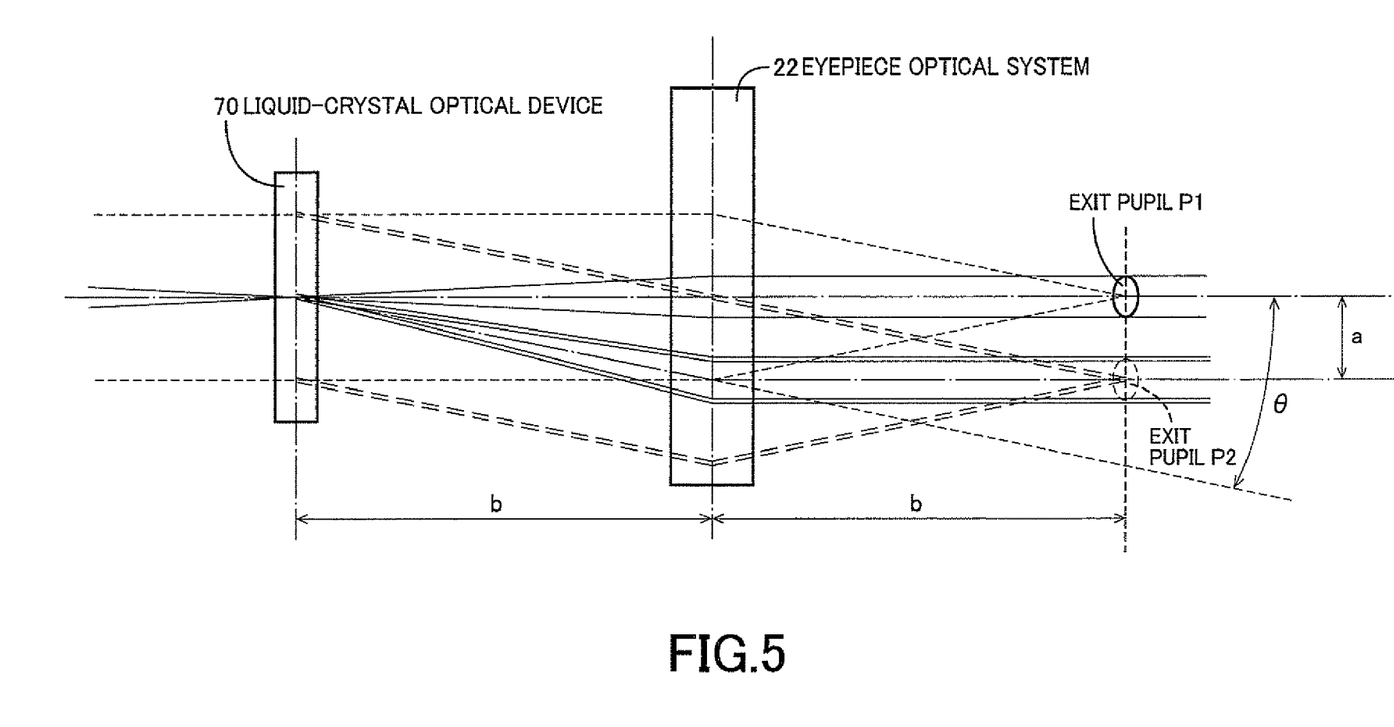
FIG. 5 is an optical path diagram for explanation of the theory in which an exit pupil of the head-mounted display device 10 depicted in FIG. 1 moves owing to optical diffraction by the liquid-crystal optical device 70 depicted in FIG. 2.

If the diffraction angle varies in the manner described above, then the exit pupil moves as illustrated in an optical path diagram in FIG. 5. More specifically, upon selection of mode 1, the liquid-crystal optical device 70 emits light along an optical pathway illustrated in dotted line in FIG. 5, with the exit pupil resultantly located at neutral position P1 on the optical axis.

Alternatively, upon selection of mode 2 or 3, the liquid-crystal optical device 70 emits light along an optical pathway illustrated in dashed double line in FIG. 5, resulting in movement of the exit pupil to position P2 which is spaced distance "a" apart from the optical axis. In an example in which the diffraction angle is 7.1 [deg] and distance "b" is 40 [mm], distance "a" is 5 [mm].

The liquid-crystal optical device 70 emits positive and negative first order diffracted light beams in mode 2 or 3, and FIG. 5 illustrates, for ease of illustration, only one of the positive and negative first order diffracted beams which forms an exit pupil located within the viewer's pupil.

In the present embodiment, sequential changes in the voltage distribution pattern for voltages applied to the first portion 72 from mode 1 to mode 3 through mode 2, would cause the first portion 72 to emit a diffracted light beam at a discretely time-varying diffraction angle, and eventually, the exit pupil of the head-mounted display device 10 moves also discretely (i.e., discontinuously, intermittently, in steps or step-wise).

As illustrated in FIG. 2, the second portion 74, as with the first portion 72, is in the form of a laminate of a transparent glass substrate 90 and a liquid-crystal layer 92. On a front face of the liquid-crystal layer 92, there are formed a plurality of stripe-shaped electrodes 94 in a parallel array. The electrodes 94 are in an array of transparent electrodes oriented perpendicularly to the electrodes 84 of the first portion 72. The electrodes 94 are arrayed in the Y-direction.

On the other hand, on a back face of the liquid-crystal layer 92, there is formed a common ground electrode 96 to the electrodes 94. The ground electrode 96 is also a transparent electrode.

The second portion 74 is common to the first portion 72 in how to operate, types of modes provided for the operation, and the relationship between the modes and the diffraction angles, which will be not elaborated to avoid redundancy.

In the present embodiment, the head-mounted display device 10 has an intermediate image plane located at a position defined on an optical pathway of the imaging light. The liquid-crystal optical device 70 is disposed at a position substantially coincident with the position of the intermediate image plane.

As illustrated in FIG. 1, the liquid-crystal optical device 70 is operated or driven by a liquid-crystal-optical-device driver 72.

It is added that, in the present embodiment, the electrically controllable element is in the form of, not limited to, the liquid-crystal optical device 70, and the electrically controllable element may alternatively be, for example, a grating light valve (GLV). The grating light valve (GLV) is configured to include: for example, a fixed grating having reflective and fixed ribbons; and a movable grating having reflective and movable ribbons which are moved relative to the fixed grating, depending on an electric signal.

Some examples of a conventional grating light valve (GLV) are disclosed in Japanese Patent Application Publication No. 2003-341128, which is incorporated hereinto by reference in its entirety.

The electrically controllable element may still alternatively be, for example, a diffraction grating which is made of an electrically expandable material in a direction in which a diffraction pitch is measured, to thereby allow the diffraction pitch to be electrically variable.

As illustrated in FIG. 1, at a position located immediately downstream of the exit-pupil controlling unit 18 described above, the pupil-position sensor 20 is disposed. The exit-pupil controlling unit 18 is configured, on a per-eye basis, to move the exit pupil of the head-mounted display device 10, so as to track movement of the viewer's pupil, based on the position of the viewer's pupil detected by the pupil-position sensor 20.

The pupil-position sensor 20, acting as a device for use in obtaining information useful to detect the position of the viewer's eye, is equipped with a half-transparent mirror 100 for reception of reflected light from the viewer's eye. The pupil-position sensor 20 is further equipped with a pupil-position detection circuit 102 for optical detection of the viewer's pupil position, based on incident light from the half-transparent mirror 100.

The half-transparent mirror 100 is designed to pass incident light from the liquid-crystal optical device 70 through the half-transparent mirror 100 toward the eyepiece optical system 22, and, at the same time, to reflect light which had been reflected from the viewer's eye and which has passed through the eyepiece optical system 22, toward a pre-defined light reception zone (not shown) of the pupil-position detection circuit 102.

The pupil-position detection circuit 102 detects the viewer's pupil position (e.g., the position of the center of the viewer's pupil), relative to a reference position of the exit pupil of the head-mounted display device 10 which is located on its optical axis (i.e., neutral position P1 of the exit pupil), in the horizontal direction (i.e., the X-direction) and the vertical direction (i.e., the Y-direction). In an example, the pupil-position detection circuit 102 is constructed using a COD (Charge Coupled Device) camera as a main component. As a result, the pupil-position detection circuit 102 outputs a signal indicating a horizontal position X of the viewer's pupil, and a signal indicating a vertical position Y of the viewer's pupil.

The eyepiece optical system 22 is configured to include an eyepiece lens 110, a half-transparent mirror 112 which acts as an optical guide for guiding the imaging light emitted from the eyepiece lens 110, toward the user's pupil.

In the present embodiment, the optical guide is in the form of the half-transparent mirror 112, allows the viewer to view a display image by reception of the imaging light emitted from the eyepiece lens 110, through reflection by the half-transparent mirror 112, while viewing an outside real world scene through the half-transparent mirror 112. That is, the head-mounted display device 10 is of a see-through type which allows the viewer to perceive a display image superimposed on a real outside world scene.

Figure 6:
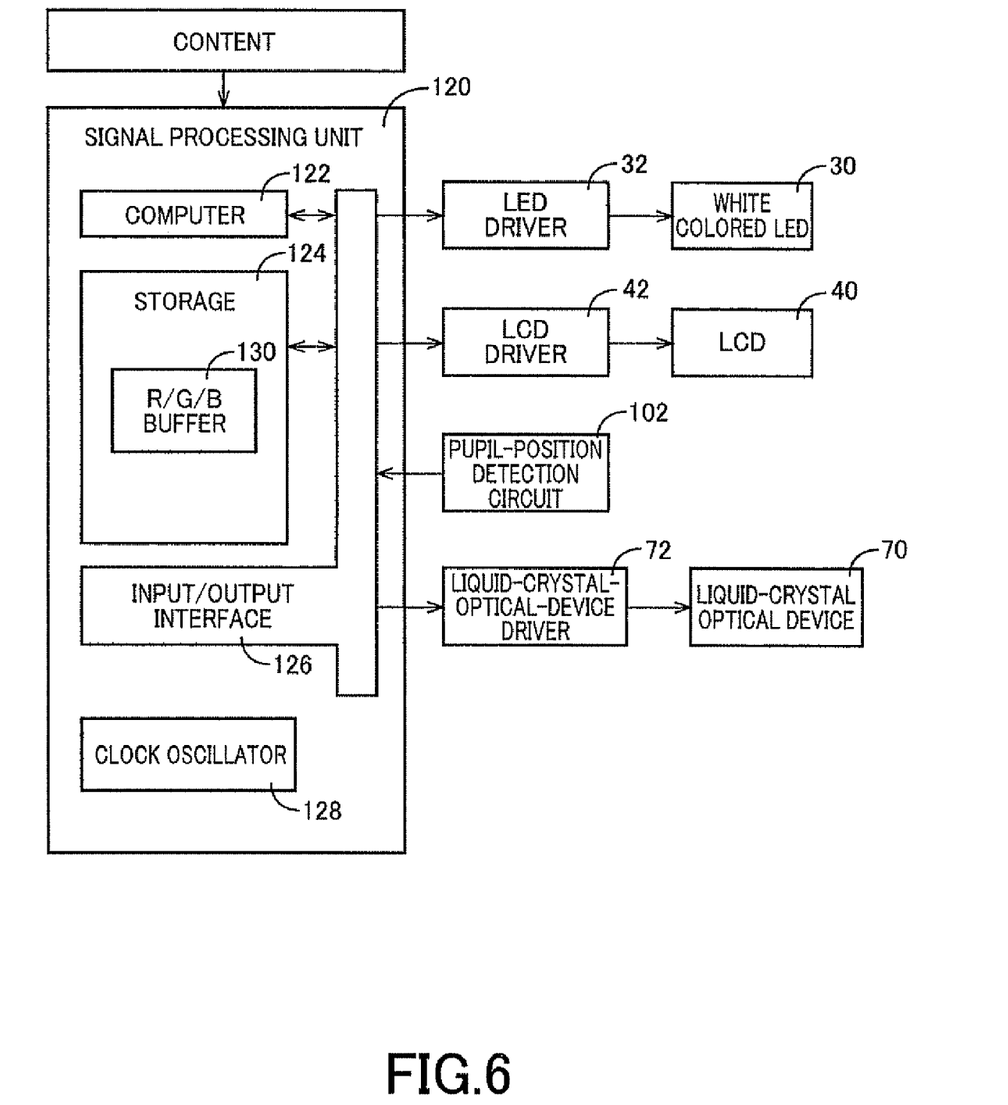
FIG. 6 is a schematic block diagram illustrating electrical features of the head-mounted display device 10 depicted in FIG. 1.

FIG. 6 illustrates conceptually in block diagram electric features of the head-mounted display device 10. The head-mounted display device 10 is equipped with a signal processing unit 120.

The signal processing unit 120 is configured to include a computer 122, a storage 124, an input-output interface 126, and a clock oscillator 128. To the input-output interface 126, there are electrically connected the LED driver 32, the LCD driver 42, the pupil-position detection circuit 102 and the liquid-crystal optical device 72 described above.

As illustrated in FIG. 6, the signal processing unit 120 is generally configured to generate, based on data indicative of content externally supplied, a signal for displaying the content, and based on the signal, control the white colored LED 30 via the LED driver 34, and the LCD 40 via the LCD driver 42.

The content is represented by an R (Red) luminance signal, a G (Green) luminance signal and a B (Blue) luminance signal. The computer 122, upon reception of those signals, stores the R, G and B luminance signals in an R/G/B buffer 130 of the storage 124. The computer 122 generates an R image signal, a G image signal and a B image signal for controlling the LCD 40, from the R, G and B luminance signals, on a per-frame basis, and then supplies these image signals to the LCD driver 42.

Figure 7:
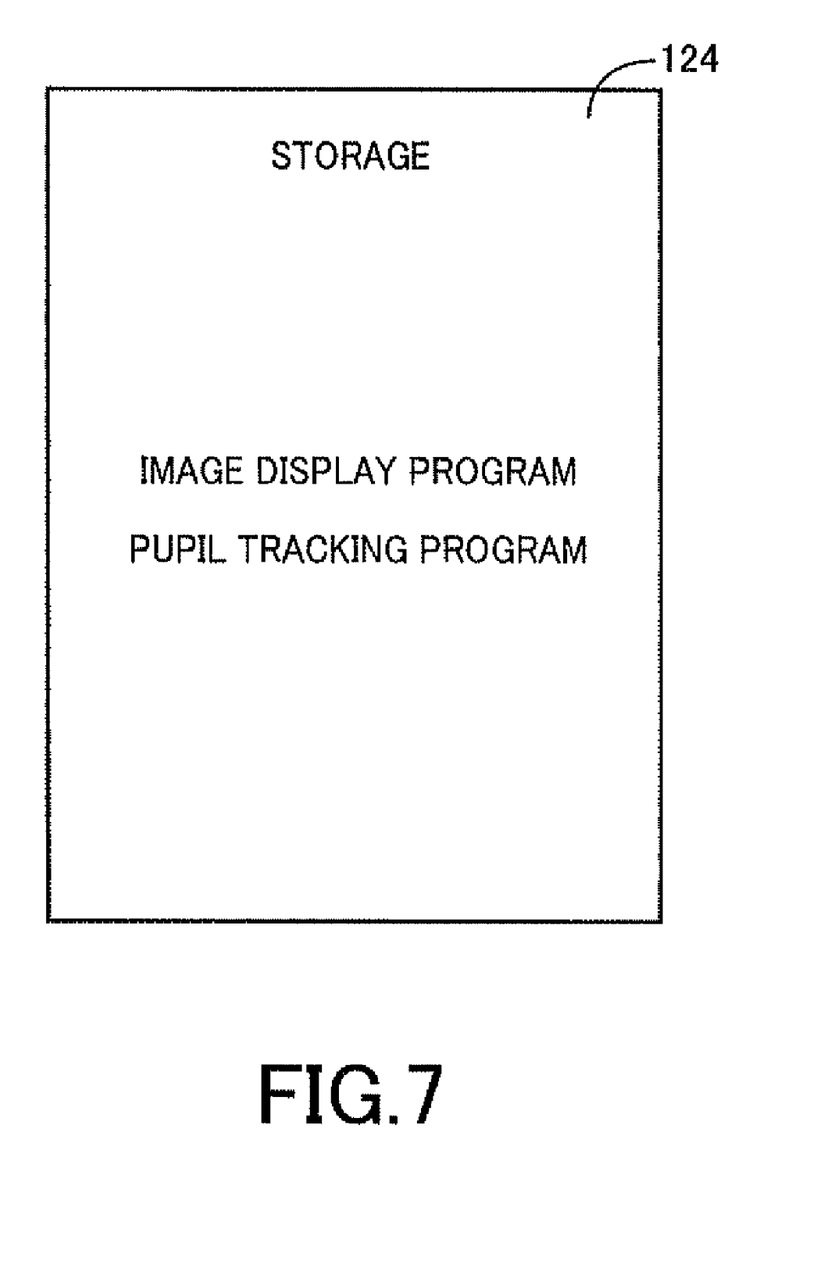
FIG. 7 is a view illustrating the names of programs which have previously been stored in a storage depicted in FIG. 6.

As illustrated in FIG. 7, the storage 124 has stored therein an image display program and a pupil tracking program, in a non-volatile manner.

The image display program is executed by the computer 122 to generate an image signal based on luminance signals indicative of content to be reproduced, and to then supply the image signal to the LCD driver 42. The image display program will not be elaborated by later description or illustration because it is executed in well-known procedures.

In contrast, the pupil tracking program is executed by the computer 122 for moving the exit pupil of the head-mounted display device 10, so as to track movement of the viewer's pupil, based on a signal, indicative of the viewer's pupil position, incoming from the pupil-position detection circuit 102. In other words, the pupil tracking program is executed by the computer 122 for allowing the exit pupil to track or trace the viewer's pupil position.

Figure 8:
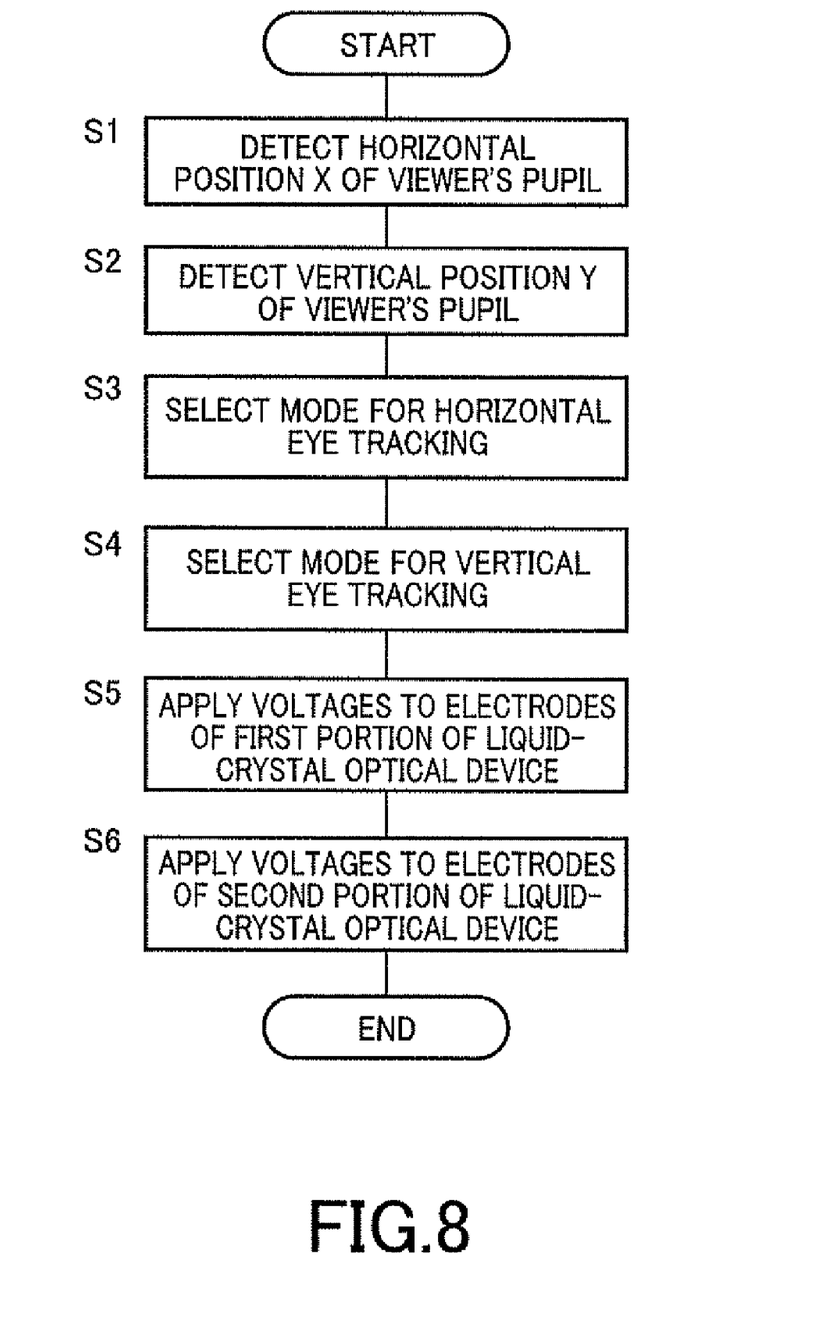
FIG. 8 is a flow chart conceptually illustrating a pupil tracking program depicted in FIG. 7.

FIG. 8 illustrates in flow chart conceptually the pupil tracking program which is executed after a user's power-on of a power supply (not shown) of the head-mounted display device 10, periodically without waiting for the user's any subsequent actions, or each time the user issues a subsequent request for another execution.

In execution, the pupil tracking program begins with step S1 to detect the horizontal position X of the viewer's pupil, based on a signal incoming from the pupil-position detection circuit 102, which is followed by step S2 to detect the vertical position Y of the viewer's pupil, based on the signal incoming from the pupil-position detection circuit 102.

Step S3 follows to select one of the aforementioned modes 1-3 which is desirable for allowing the exit pupil to track the viewer's pupil horizontally, based on the detected horizontal position X. Step S4 follows to select one of the aforementioned modes 1-3 which is desirable for allowing the exit pupil to track the viewer's pupil vertically, based on the detected vertical position Y.

The mode selection for horizontal eye tracking and the mode selection for vertical eye tracking are made by a common algorithm which will be described in more detail with reference to FIG. 9.

Figure 9:
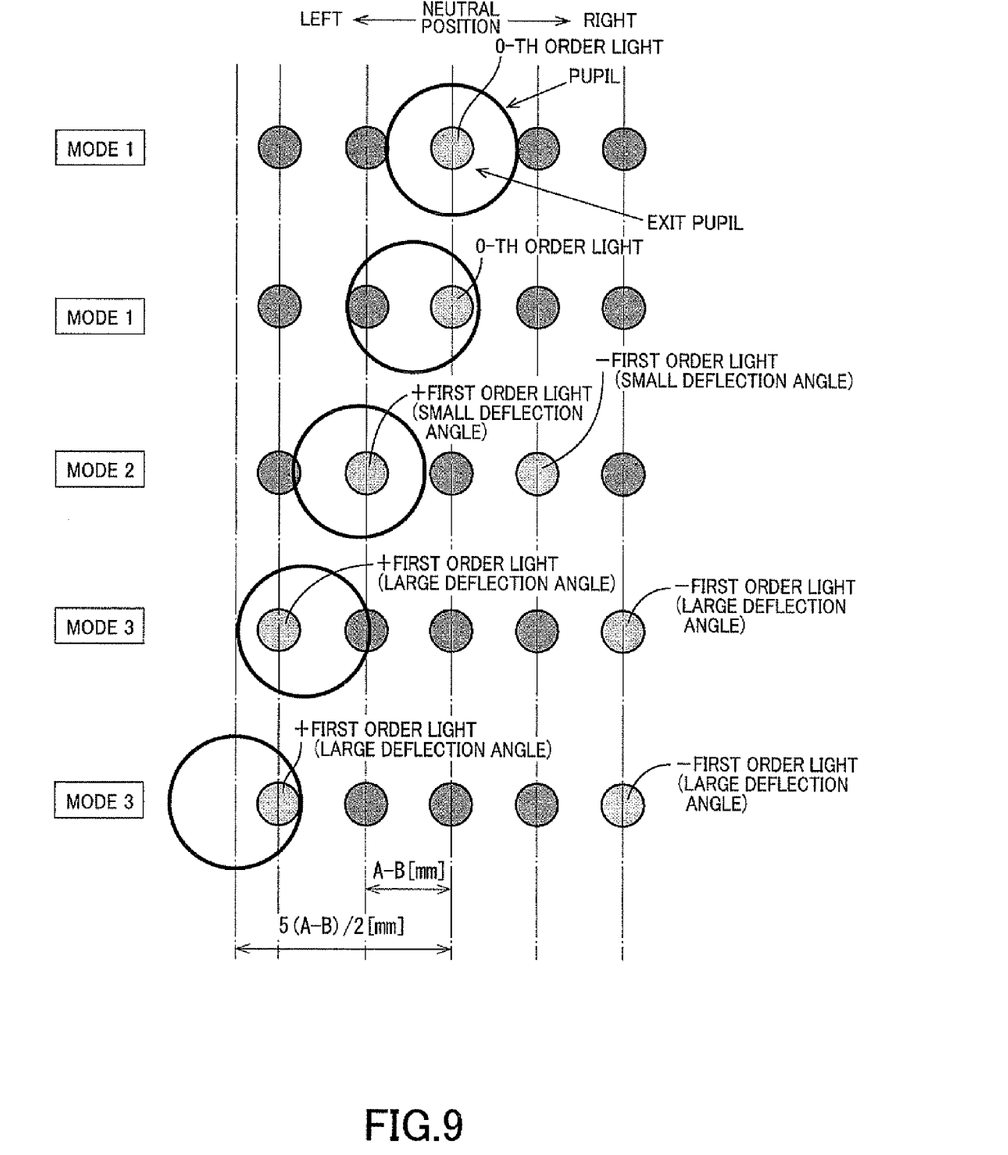
FIG. 9 is a view for explanation of the algorithm in which one of three modes is selected depending on the position of a viewer's pupil as a result of execution of the pupil tracking program depicted in FIG. 8.

FIG. 9 illustrates plural positions which the exit pupil of the head-mounted display device 10 can take, on a per-mode basis, in a linear horizontal array of five circles, with the viewer's pupil denoted by a circle which is larger than that denoting the exit pupil. Actually, the viewer's pupil is larger than the exit pupil.

In the present embodiment, as described above, selection of mode 1 causes the liquid-crystal optical device 70 to emit a 0-th order diffracted light beam, selection of mode 2 causes the liquid-crystal optical device 70 to emit positive and negative first order diffracted light beams, at smaller diffraction or deflection angles, and selection of mode 3 causes the liquid-crystal optical device 70 to emit positive and negative first order diffracted light beams, at larger diffraction or deflection angles.

In the liquid-crystal optical device 70, ones of the electrodes 84 are selected for voltage application, such that a selected isolated electrode (i.e., one selected electrode which is not adjacent to any other selected electrodes) is repeated at fixed intervals (see FIG. 3C), or such that a pair of selected adjacent or consecutive electrodes is repeated at fixed intervals (see FIG. 3B). In the liquid-crystal optical device 70, the shorter the intervals are, the larger the diffraction angle is.

In the present embodiment, the configuration and the control method of the liquid-crystal optical device 70 are pre-selected, so that the exit pupil can move by amounts which are approximately the same between when changing from mode 1 to 2 and when changing from mode 2 to 3. The configuration and the control method of the liquid-crystal optical device 70 are further pre-selected, so that, where "A" denotes an average diameter of the viewer's pupil, and "B" denotes a diameter of the exit pupil, the exit pupil can move by a distance approximately equal to "(A-B)" when changing from mode 1 to 2 and when changing from mode 2 to 3.

As illustrated in FIG. 9, in the present embodiment, the exit pupil moves not continuously but discretely. In addition, in the present embodiment, in order to prevent ghost images in display, it is preferable for only one exit pupil to exist in the viewer's pupil, and, in order to ensure a desired brightness of a display image, it is preferable for the entirety of one exit pupil to exist within the viewer's pupil.

In the present embodiment, if the viewer's pupil moves, then only one of the possible discrete positions that the viewer's pupil can take is selected, which simultaneously meet both condition (1) that only one exit pupil exists in the viewer's pupil, and condition (2) that the entirety of one exit pupil exists within the viewer's pupil.

More specifically, describing the horizontal eye tracking by way of example, if the horizontal position X of the viewer's pupil relative to the neutral position (horizontal position X=0) (i.e., a deviation of the center of the viewer's pupil from the neutral position) is smaller than "(A-B)/2," then mode 1 is selected to eventually generate the 0-th order light to form the exit pupil within the viewer's pupil.

If the horizontal position X is not smaller than "(A-B)/2" and smaller than "3(A-B)/2," then mode 2 is selected to eventually generate the positive or negative first order light with a smaller diffraction angle, to form the exit pupil within the viewer's pupil.

If the horizontal position X is not smaller than "3 (A-B)/2" and smaller than "5(A-B)/2," then mode 3 is selected to eventually generate the positive or negative first order light with a larger diffraction angle, to form the exit pupil within the viewer's pupil.

Returning next to FIG. 8, in the present embodiment, step S3 is implemented to select one of modes 1-3 which is to be implemented for the horizontal eye tracking, based on the horizontal position X of the viewer's pupil, by the aforementioned mode-selection algorithm. Step S4 follows to select one of modes 1-3 which is to be implemented for the vertical eye tracking, based on the vertical position Y of the viewer's pupil, by the aforementioned mode-selection algorithm.

Step S5 follows to apply voltages to the electrodes 84 of the first portion 72 of the liquid-crystal optical device 70, which is to say, a portion for moving the exit pupil horizontally, according to the voltage distribution pattern corresponding to the mode which has been selected at step S3. This allows the horizontal position of the exit pupil to move toward or to the current horizontal position of the viewer's pupil.

Step S6 follows to apply voltages to the electrodes 94 of the second portion 74 of the liquid-crystal optical device 70, which is to say, a portion for moving the exit pupil vertically, according to the voltage distribution pattern corresponding to the mode which has been selected at step S4. This allows the vertical position of the exit pupil to move toward or to the current vertical position of the viewer's pupil.

Then, one cycle of execution of the pupil tracking program is terminated.

As will be evident from the foregoing, in the present embodiment, it can be considered, for ease of description, that the liquid-crystal optical device 70 and a portion of the signal processing unit 120 which is assigned for executing the pupil tracking program illustrated in FIG. 8 together constitute an example of the "exit-pupil controlling unit" set forth in the aforementioned mode (1), the portion of the signal processing unit 120 which is assigned for executing the pupil tracking program illustrated in FIG. 8 constitutes an example of the "controller" set forth in the same mode, and the liquid-crystal optical device 70 constitutes an example of the "electrically controllable element" set forth in the same mode.

Further, in the present embodiment, it can be considered, for ease of description, that a portion of the computer 122 which is assigned for executing steps S3-S6 depicted in FIG. 8 constitutes an example of the "distribution pattern changer" set forth in the aforementioned mode (2).

It is added that, in the present embodiment, as evidently from FIG. 9, if not mode 1 but mode 2 or 3 is selected, then two diffracted light beams are generated. However, only one of them can contribute to the formation of the exit pupil within the viewer's pupil. For this reason, when mode 2 or 3 is selected, as opposed to when mode 1 is selected, there is the need for compensating the intensity of light emitted from the light source 12 such as an additional process of increasing or decreasing the light intensity of the light source 12, in order to keep the brightness of a display image unchanged. In other words, it is necessary to modulate the intensity of light emitted from the light source 12 in synchronization with movement of the exit pupil or change in the operational mode of the liquid-crystal optical device 70, to thereby eliminate unintended variation in the amount of light incident on the viewer's pupil.

Figure 10A:
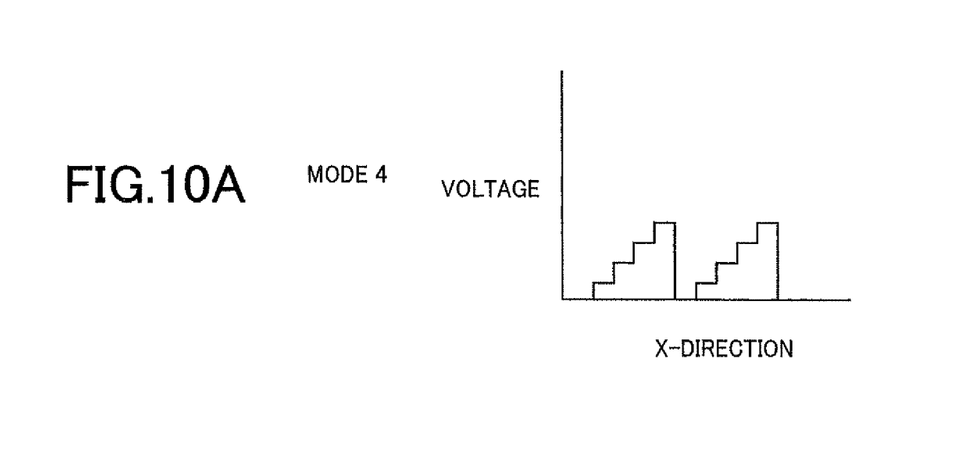
FIG. 10A is a graph illustrating an additional mode 4 in which voltages are applied to the electrodes 84 of the liquid-crystal optical device 70 depicted in FIG. 2.

In an alternative, voltages may be applied to groups of selected consecutive ones of the electrodes 84 and groups of selected consecutive ones of the electrodes 94 of the liquid-crystal optical device 70, such that monotonously increasing voltages are applied to electrodes within each group, in a distribution pattern illustrated as mode 4 in FIG. 10A, to thereby allow the liquid-crystal optical device 70 to act as a brazed grating.

Figure 10B:
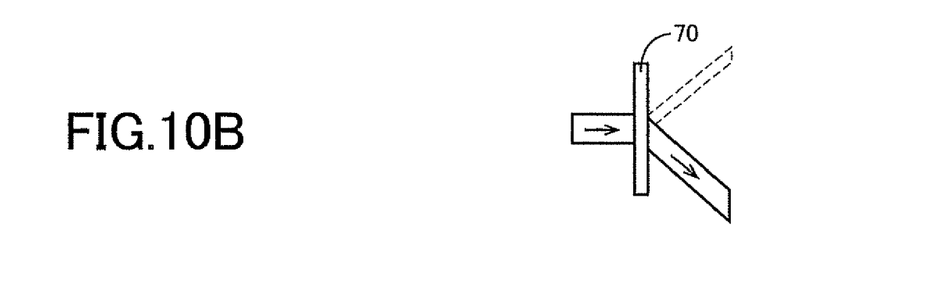
FIG. 10B is an optical path diagram for explanation of a diffraction pattern that the liquid-crystal optical device 70 takes in mode 4.

When the liquid-crystal optical device 70 to act as a brazed grating, the intensities of diffracted light beams emitted from the grating are higher on a selected one of positive and negative sides of the optical axis (or the grating normal) of the liquid-crystal optical device 70, than on an unselected side, as illustrated in FIG. 10B.

With this in mind, the invention may be practiced in an arrangement in which, based on a signal from the pupil-position detection circuit 102, the viewer's pupil is detected with regard to not only an amount by which the position is deviated from the neutral position but also a direction in which the position is deviated from the neutral position, and based on the detection results, voltages are applied to the electrodes 84 and the electrodes 94, in a voltage distribution pattern that allows the liquid-crystal optical device 70 to act as a brazed grating.

It is further added that, in the present embodiment, the exit pupil is automatically moved so as to track movement of the viewer's pupil, and the invention may be alternatively practiced in an arrangement in which the liquid-crystal optical device 70 is electrically controlled manually, such that the exit pupil moves to a target position identified by a user's instruction.

Next, an illustrative second embodiment of the invention will be described below. The present embodiment is different from the first embodiment with regard to a light source and an imaging-light generator, and is common to the first embodiment with regard to the remaining features, and therefore, the present embodiment will be described only with regard to its light source and imaging-light generator.

Figure 11:
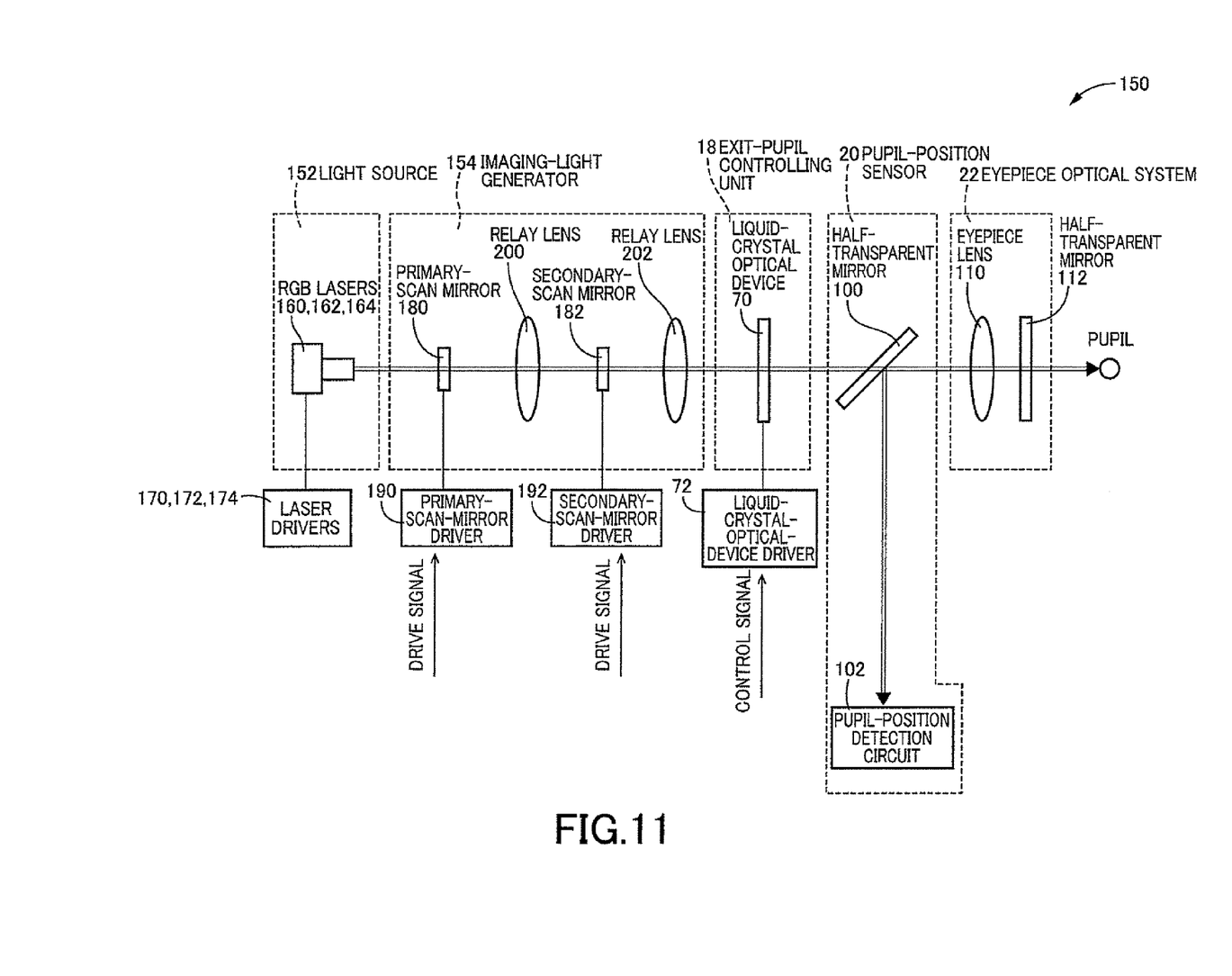
FIG. 11 is an optical path diagram conceptually illustrating a head-mounted display device 150 according to an illustrative second embodiment of the invention.

Referring now to FIG. 11, there is illustrated in an optical path diagram conceptually a head-mounted display device 150 according to an illustrative second embodiment of the invention.

The head-mounted display device 150 is generally configured to convert a light beam emitted from a light source into imaging light in the form of surface light, using a scanner, wherein the light beam has been intensity-modulated on a per-pixel basis, and to project the imaging light through the viewer's pupil onto the viewer's retina, to thereby allow the viewer to perceive a display image as a virtual image.

As illustrated in FIG. 11, the head-mounted display device 150 includes a light source 152 and an imaging-light generator 154, each of which is different from that in the first embodiment, and further includes the exit-pupil controlling unit 18, the pupil-position sensor 20 and the eyepiece optical system 22, each of which is common to that in the first embodiment.

The light source 152 includes a laser 160 which emits a red-colored laser beam, a laser 162 which emits a green-colored laser beam, and a laser 164 which emits a blue-colored laser beam. These lasers 160, 162 and 164 emit laser beams with intensities modulated by respective laser drivers 170, 172 and 174. Three colored laser beams emitted from the laser 160, 162 and 164 are combined into a composite laser beam representing the color of a successively-selected one of pixels at each instantaneous time. The composite laser beam enters the imaging-light generator 154.

The imaging-light generator 154 includes a primary scan mirror 180 driven for horizontal scan of a laser beam incoming from the light source 152 (e.g., a polygon mirror), and a secondary scan mirror 182 driven for vertical scan of a laser beam incoming from the primary scan mirror 180 (e.g., a galvano mirror or galvanometer mirror). The primary scan mirror 180 is driven by a primary-scan-mirror driver 190, and the secondary scan mirror 182 is driven by a secondary-scan-mirror driver 192.

The imaging-light generator 154 further includes a front-stage relay lens 200 and a rear-stage relay lens 202. The front-stage relay lens 200 is configured to focus an image from the primary scan mirror 180 onto the secondary scan mirror 182, while the rear-stage relay lens 202 is configured to cause a light beam scanned by the secondary scan mirror 182, to form an intermediate image plane on the liquid-crystal optical device 70.

It is added that, while the liquid-crystal optical device 70 is actually disposed at a position equal to the position of an intermediate image plane between the rear-stage relay lens 202 and the eyepiece lens 110, FIG. 11 illustrates these elements in a different proportion from the actual one, for ease of illustration.

In the present embodiment, as with the first embodiment, the exit-pupil controlling unit 18 moves the exit pupil of the head-mounted display unit 150, so as to track movement of the viewer pupil, based on the viewer's pupil position detected by the pupil-position sensor 20. This allows the viewer to continue viewing a display image in the same state, irrespective of whether or not the viewer's pupil moves.

Reference throughout the specification to "one embodiment" or "an embodiment" means that a particular feature, structure, or characteristic described in connection with the embodiment is included in at least one embodiment of the present invention.

Thus, the appearance of the phrases "in one embodiment" or "in an embodiment" in various places throughout the specification are not necessarily all referring to the same embodiment. Furthermore, the particular features, structures, or characteristics may be combined in any suitable manner in one or more embodiments.

Moreover, inventive aspects lie in less than all features of a single disclosed embodiment. Thus, the claims following the Detailed Description are hereby expressly incorporated into this Detailed Description, with each claim standing on its own as a separate embodiment of this invention.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. An image display device for optically displaying an image, comprising:
    a light source;
    an imaging-light generator converting light emitted from the light source, into imaging light representative of the image to be displayed to a viewer, to thereby generate the imaging light; and
    an exit-pupil controlling unit configured to control a position of an exit pupil of the image display device,
    wherein the exit-pupil controlling unit comprises:
    an electrically controllable element configured to diffract the imaging light incoming from the imaging-light generator, at an electrically-variable diffraction angle; and
    a controller configured to electrically control the diffraction angle of diffracted light emitted from the electrically controllable element, to thereby control the position of the exit pupil.

2. The image display device according to claim 1, wherein the electrically controllable element includes a liquid-crystal optical device,
    the liquid-crystal optical device is configured to include a plurality of stripe electrodes to which a plurality of respective voltages are applied at a time, and a liquid-crystal layer having a surface on which the electrodes are formed, the liquid-crystal optical device emitting the diffracted light at the diffraction angle which varies depending on a voltage distribution pattern of the voltages applied to the electrodes, and
    the controller includes a distribution pattern changer configured to change the voltage distribution pattern, to thereby control the position of the exit pupil.

3. The image display device according to claim 1, wherein the electrically controllable element includes a grating light valve (GLV), and
    the grating light valve is configured to include:
    reflective and fixed ribbons; and
    reflective and movable ribbons which are moved relative to the fixed ribbons, depending on an electric signal.

4. The image display device according to claim 1, wherein the electrically controllable element includes a diffraction grating which is made of an electrically expandable material in a direction in which a diffraction pitch is measured, to thereby allow the diffraction pitch to be electrically variable.

5. The image display device according to claim 1, wherein the electrically controllable element can emit a plurality of diffracted light beams wholly or partly,
    the diffracted light beams form a plurality of possible positions of the exit pupil, respectively, and
    the controller is configured to electrically control the electrically controllable element such that at least part of only one of the diffracted light beams enters the viewer's pupil, based on relative position information between an actual position of the viewer's pupil and the possible positions of the exit pupil, to thereby move the exit pupil to track movement of the viewer's pupil.

6. The image display device according to claim 1, wherein the electrically controllable element can emit a plurality of diffracted light beams wholly or partly,
    the diffracted light beams form a plurality of possible positions of the exit pupil, respectively, and
    the controller is configured to electrically control the electrically controllable element such that an entirety of only one of the diffracted light beams enters the viewer's pupil, based on relative position information between an actual position of the viewer's pupil and the possible positions of the exit pupil, to thereby move the exit pupil to track movement of the viewer's pupil.

7. The image display device according to claim 1, wherein the electrically controllable element has an optical axis and emits diffracted light beams to positive and negative sides of the optical axis, and
    the controller is configured to electrically control the electrically controllable element, such that intensities of the diffracted light beams are higher on a selected one of the positive and negative sides, than on an unselected side.

8. The image display device according to claim 1, wherein the controller is configured to electrically control the electrically controllable element, such that the exit pupil moves discretely as the viewer's pupil moves.

9. The image display device according to claim 1, further comprising a pupil-position sensor detecting the position of the viewer's pupil, wherein the controller is configured to electrically control the electrically controllable element such that the exit pupil moves to track movement of the viewer's pupil, based on an output signal of the pupil-position sensor.

10. The image display device according to claim 1, which is configured to have an intermediate image plane at a position on a pathway of the imaging light, wherein the electrically controllable element is disposed at a position generally equal to the position of the intermediate image plane.

11. The image display device according to claim 1, wherein the electrically controllable element diffracts the imaging light incoming from the imaging-light generator, two dimensionally, and the controller is configured to electrically control the electrically controllable element such that the position of the exit pupil is controlled two dimensionally so as to track movement of the viewer's pupil.

12. The image display device according to claim 1, wherein the controller is configured to electrically control the diffraction angle of the diffracted light emitted from the electrically controllable element, based on an input signal indicative of a user's instruction, to thereby move the exit pupil toward a target position represented by the input signal.

13. The image display device according to claim 1, further comprising an intensity compensator configured to compensate an intensity of outgoing light from the light source, depending on the position of the exit pupil.

* * * * *